United States Patent
Yu et al.

(10) Patent No.: US 12,335,511 B2
(45) Date of Patent: *Jun. 17, 2025

(54) SYSTEM AND METHOD OF MOTION INFORMATION STORAGE FOR VIDEO CODING AND SIGNALING

(71) Applicant: ARRIS Enterprises LLC, Horsham, PA (US)

(72) Inventors: Yue Yu, San Diego, CA (US); Limin Wang, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,755

(22) Filed: Apr. 19, 2024

(65) Prior Publication Data
US 2024/0267552 A1  Aug. 8, 2024

Related U.S. Application Data

(63) Continuation of application No. 18/105,182, filed on Feb. 2, 2023, now Pat. No. 11,997,305, which is a
(Continued)

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/107* (2014.11);
(Continued)

(58) Field of Classification Search
CPC ...... H04N 19/70; H04N 19/96; H04N 19/105; H04N 19/107; H04N 19/172; H04N 19/176; H04N 19/513; H04N 19/517
(Continued)

(56) References Cited

U.S. PATENT DOCUMENTS

2004/0264570 A1* 12/2004 Kondo ............... H04N 19/513
  375/E7.199
2011/0110428 A1* 5/2011 Chang ............... H04N 19/61
  375/E7.123
(Continued)

FOREIGN PATENT DOCUMENTS

WO  2013/075042 A1  5/2013

OTHER PUBLICATIONS

Le Leannec et al., "Asymmetric Coding Units in QTBT", 4th Meeting of the Joint Video Exploration Team (JVET), Chengdu, CN, JVET-D0064, Oct. 2016, 10 pages (Year: 2016).
(Continued)

*Primary Examiner* — Christopher S Kelley
*Assistant Examiner* — Asmamaw G Tarko
(74) *Attorney, Agent, or Firm* — Chernoff, Vilhauer, McClung & Stenzel, LLP

(57) ABSTRACT

A system and method are provided for inter-ceding video in which encoder and decoder memory requirements associated with storage of motion information related to collocated coding units is reduced. In some embodiments motion information related to only a single collocated coding unit may be stored at the encoder and decoder. In operation, if the encoder determines that motion information for a current coding unit should replace the currently stored motion information for the currently stored motion information for the collocated coding unit, then the encoder can replace the motion information at the encoder and transmit an indicator with the current coding unit to signal to the decoder that the motion information currently stored should be updated or replaced with the motion information associated with the current coding unit.

7 Claims, 12 Drawing Sheets

Related U.S. Application Data continuation of application No. 16/290,393, filed on Mar. 1, 2019, now Pat. No. 11,601,668.

(60) Provisional application No. 62/645,942, filed on Mar. 21, 2018, provisional application No. 62/637,343, filed on Mar. 1, 2018.

(51) Int. Cl.
| | |
|---|---|
| *H04N 19/107* | (2014.01) |
| *H04N 19/172* | (2014.01) |
| *H04N 19/176* | (2014.01) |
| *H04N 19/517* | (2014.01) |
| *H04N 19/70* | (2014.01) |
| *H04N 19/96* | (2014.01) |

(52) U.S. Cl.
CPC ......... *H04N 19/172* (2014.11); *H04N 19/176* (2014.11); *H04N 19/70* (2014.11); *H04N 19/96* (2014.11); *H04N 19/517* (2014.11)

(58) Field of Classification Search
USPC ............................... 375/240, 240.12, 240.16
See application file for complete search history.

(56) References Cited

U.S. PATENT DOCUMENTS

| | | | | |
|---|---|---|---|---|
| 2013/0182769 A1* | 7/2013 | Yu | ....................... | H04N 19/172 |
| | | | | 375/240.16 |
| 2014/0092981 A1* | 4/2014 | Lin | ....................... | H04N 19/119 |
| | | | | 375/240.16 |
| 2014/0219357 A1* | 8/2014 | Chuang | ................ | H04N 19/593 |
| | | | | 375/240.16 |
| 2014/0241434 A1* | 8/2014 | Lin | ....................... | H04N 19/597 |
| | | | | 375/240.16 |
| 2016/0191933 A1* | 6/2016 | Ikai | ........................ | H04N 19/58 |
| | | | | 375/240.16 |
| 2017/0208336 A1* | 7/2017 | Li | ......................... | H04N 19/176 |
| 2017/0272782 A1* | 9/2017 | Li | ......................... | H04N 19/46 |
| 2017/0347128 A1 | 11/2017 | Panusopone et al. | | |
| 2018/0109814 A1* | 4/2018 | Chuang | ................ | H04N 19/176 |
| 2018/0199072 A1* | 7/2018 | Li | ......................... | H04N 19/186 |
| 2018/0359483 A1* | 12/2018 | Chen | ..................... | H04N 19/52 |
| 2019/0200043 A1* | 6/2019 | Egilmez | ............... | H04N 19/172 |
| 2019/0208225 A1* | 7/2019 | Chen | ..................... | H04N 19/176 |
| 2019/0246143 A1* | 8/2019 | Zhang | .................. | H04N 19/132 |
| 2019/0273937 A1 | 9/2019 | Yu et al. | | |
| 2019/0313108 A1* | 10/2019 | Zhang | .................. | H04N 19/159 |
| 2020/0112738 A1* | 4/2020 | Lee | ....................... | H04N 19/136 |
| 2020/0162729 A1* | 5/2020 | Lee | ....................... | H04N 19/46 |
| 2020/0374530 A1* | 11/2020 | Racape | ................ | H04N 19/593 |
| 2021/0266536 A1* | 8/2021 | Leleannec | ........... | H04N 19/176 |
| 2021/0281858 A1 | 9/2021 | Hannuksela | | |
| 2021/0368172 A1* | 11/2021 | Lim | ..................... | H04N 19/119 |
| 2022/0353509 A1* | 11/2022 | Lim | ..................... | H04N 19/176 |

OTHER PUBLICATIONS

Xiang Li et al., "Multi-Type-Tree", 4th Meeting of the Joint Video Exploration Team (JVET), Chengdu, CN, JVET-D0117r1, Oct. 2016, 3 pages (Year: 2016).

PCT International Search Report & Written Opinion, Re:Application No. PCT/US2019/020414, dated Apr. 25, 2019.

Y. Yu, et al., "Implicit signaling of collocated picture for HEVC", 99th MPEG Meeting/8th JCTVC Meeting, San Jose, Feb. 1, 2012.

S. Kadono, et al., "Memory Reduction for Temporal Technique of Direct Mode", 5th JVT Meeting, Geneva, No. JVT-E076, Oct. 18, 2002.

J. Chen, et al., "Algorithm Description of Joint Exploration Test Model 5 (JEM 5)", 5th Meeting of the Joint Video Exploration Team, Geneva, JVET-E1001-V2, Jan. 2017, 44 pgs.

* cited by examiner

| | Descriptor |
|---|---|
| seq_parameter_set_rbsp() { | |
| sps_video_parameter_set_id | u(4) |
| sps_max_sub_layers_minus1 | u(3) |
| sps_temporal_id_nesting_flag | u(1) |
| ............ | |
| ............ | |
| sps_temporal_mvp_enabled_flag | u(1) |
| reduced_collocated_mem_enabled_flag | u(1) |
| strong_intra_amoothing_enabled_flag | u(1) |
| ............ | |
| rbsp_trailing_bits() | |
| } | |

| slice_segment_header( ) { | Descriptor |
|---|---|
|   first_slice_segment_in_pic_flag | u(1) |
|   if(nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if( !first_slice_segment_in_pic_flag) { | |
|     if( dependent_slice_segment_enabled_flag) | |
|       dependent_slice_segment_flag | u(1) |
|     slice_segment_address | u(v) |
|   } | |
|   if( !dependent_slice_segment_flag) { | |
|     for( i = 0; i < num_extra_slice_header_bits; i++ ) | |
|       slice_reserved_flag[ i ] | u(1) |
|     slice_type | ue(v) |
|     if(reduced_collocated_mem_enabled_flag ) | |
|       update_collocated_pic_flag | u(1) |
|     if( output_flag_present_flag ) | |
|       pic_output_flag | u(1) |
|     if( separate_colour_plane_flag == 1 ) | |
|       colour_plane_id | u(2) |
|     if(nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set(num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i<num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(l) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |

FIG. 9A

| | |
|---|---|
| } | |
| } | |
| if( sps_temporal_mvp_enabled_flag ) | |
|     slice_temporal_mvp_enabled_flag | u(1) |
| } | |
| if( sample_adaptive_offset_enabled_flag) { | |
|     slice_sao_luma_flag | u(1) |
|     if( ChromaArrayType != 0 ) | |
|         slice_sao_chroma_flag | u(v) |
| } | |
| if( slice_type == P \|\| slice_type == B ) { | |
|     num_ref_idx_active_override_flag | u(1) |
|     if( num_ref_idx_active_override_flag ) { | |
|         num_ref_idx_l0_active_minus1 | ue(v) |
|         if( slice_type == B ) | |
|             num_ref_idx_l1_active_minus1 | ue(v) |
|     } | |
|     if( lists_modification_present_flag && NumPocTotalCurr > 1 ) | |
|         ref_pic_lists_modification( ) | |
|     if( slice_type == B ) | |
|         mvd_l1_zero_flag | u(1) |
|     if( cabac_init_present_flg ) | |
|         cabac_init_flag | u(1) |
|     if( slice_temporal_mvp_enabled_flag ) { | |
|         if( slice_type == B ) | |
|             collocated_from_l0_flag | u(l) |
|         if( ( collocated_from_l0_flag && num_ref_idx_l0_active_minus1 > 0 ) \|\| <br>           ( collocated_from_l0_flag && num_ref_idx_l0_active_minus1 > 0 ) ) | 904 |
|             collocated_ref_idx | ue(v) |
|     } | |
|     if( ( weighted_pred_flag && slice_type == P ) \|\| <br>         ( weighted_bipred_flag && slice_type == B ) ) | |
|         pred_weight_table( ) | |
|     five_minus_max_num_merge_cand | ue(v) |
| } | |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| if( chroma_qp_adustment_enabled_flag ) | |
|     slice_chroma_qp_adjustment_enabled_flag | u(1) |
| if( deblocking_filter_override_enabled_flag ) | |
|     deblocking_filter_override_flag | ue(v) |

*FIG. 9B*

| | |
|---|---|
| if( deblocking_filter_override_flag ) { | |
|     slice_deblocking_filter_disabled_flag | u(1) |
|     if( !slice_deblocking_filter_disabled_flag ) { | |
|         slice_beta_offset_div2 | se(v) |
|         slice_tc_offset_div2 | se(v) |
|     } | |
| } | |
| if( pps_loop_filter_across_slices_enabled_flag && <br>    ( slice_sao_luma_flag \|\| slice_sao_chroma_flag \|\| <br>    !slice_deblocking_filter_disabled_flag ) ) | |
|     slice_loop_filter_across_slices_enabled_flag | u(1) |
| } | |
| if( tiles_enabled_flag \|\| entropy_coding_sync_enabled_flag ) { | |
|     num_entry_point_offsets | ue(v) |
|     if( num_entry_point_offsets > 0 ) { | |
|         offset_len_minus1 | ue(v) |
|         for( i = 0; < num_entry_point_offset; i++ ) | |
|             entry_point_offset_minus1[ i ] | u(v) |
|     } | |
| } | |
| if( slice_segment_header_extension_present_flag ) { | |
|     slice_segment_header_extension_length | ue(v) |
|     for( i = 0; i<slice_segment_header_extension_length; i++) | |
|         slice_segment_header_extension_data_byte[ i ] | u(8) |
| } | |
| byte_alignment( ) | |
| } | |

*FIG. 9C*

| | |
|---|---|
| nal_unit_header( ) { | Descriptor |
|     forbidden_zero_bit | f(1) |
|     nal_unit_type | u(6) |
| 1002 —   nal_unit_col_type | u(1) |
|     nuh_layer_id | u(5) |
|     nuh_temporal_id_plus1 | u(3) |
| } | |

*FIG. 10*

SYSTEM AND METHOD OF MOTION INFORMATION STORAGE FOR VIDEO CODING AND SIGNALING

CLAIM OF PRIORITY

This Application is a continuation of U.S. patent application Ser. No. 18/105,182, filed Feb. 2, 2023, which is a continuation of U.S. patent application Ser. No. 16/290,393, filed Mar. 1, 2019, now U.S. Pat. No. 11,601,668, which claims priority under 35 U.S.C. § 119(e) from earlier filed U.S. Provisional Application Ser. No. 62/637,343, filed Mar. 1, 2018, and U.S. Provisional Application Ser. No. 62/645,942, filed Mar. 21, 2018 the entireties of each of which are hereby incorporated herein by reference.

TECHNICAL FIELD

The present disclosure relates to the field of video coding, particularly coding efficiency increases, and memory burden associated with reduction of the number of stored collocated pictures.

BACKGROUND

The technical improvements in evolving video coding standards illustrate the trend of increasing coding efficiency to enable higher bit-rates, higher resolutions, and better video quality. The Joint Video Exploration Team developed a new video coding scheme referred to as JVET and is developing a newer video coding scheme referred to a Versatile Video Coding (VVC)—the complete contents of the VVC 7th edition of draft 2 of the standard titled Versatile Video Coding (Draft 2) by JVET published Oct. 1, 2018 is hereby incorporated herein by reference. Similar to other video coding schemes like HEVC (High Efficiency Video Coding), both JVET and VVC are block-based hybrid spatial and temporal predictive coding schemes. However, relative to HEVC, JVET and VVC include many modifications to bitstream structure, syntax, constraints, and mapping for the generation of decoded pictures. JVET has been implemented in Joint Exploration Model (JEM) encoders and decoders, but VVC is not anticipated to be implemented until early 2020.

Current and anticipated video coding schemes typically require that multiple pictures be stored at both the encoder and decoder in order to code and decode video. However, transmission and storage of such information can be burdensome. Accordingly, what is needed is a system and method of motion information storage for video coding and signaling that reduces system burdens.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can comprise determining motion information associated with a collocated coding unit; determining motion information associated with a current coding unit; and storing said motion information associated with said current coding unit as said motion information associated with said collocated coding unit, if it is determined that said motion information associated with said collocated coding unit is to be replaced with said motion information associated with said current coding unit. Some embodiments can further comprise encoding said current coding unit, wherein said encoded current coding unit includes an indicator identifying whether said motion information associated with said current coding unit is to be replace said motion information associated with said collocated coding unit. Other embodiments of this aspect include corresponding computer systems, apparatus, and computer programs recorded on one or more computer storage devices, each configured to perform the actions of the methods.

Some embodiments can comprise one or more of the following features: said indicator is included in a Network Abstraction Layer (NAL) unit associated with said current coding unit; said indicator is included within a header of said NAL unit; said indicator is a single bit; said current coding unit is encoded according to JVET, HEVC or VVC. The method of inter-coding can also further comprising receiving said encoded current coding unit; determining whether said encoded current coding unit includes said indicator; and storing said motion information associated with said current coding unit as said motion information associated with said collocated coding unit, if said indicator is determined to be present. Implementations of the described techniques may include hardware, a method or process, or computer software on a computer-accessible medium.

Some embodiments of the system and method can also comprise a system of inter-coding comprising: storing in a first portion of memory motion information associated with a collocated coding unit; storing in a second portion of memory motion information associated with a current coding unit; replacing in memory said motion information associated with said collocated information with said motion information associated with said current coding, if it is determined that said motion information associated with said collocated coding unit is to be replaced with said motion information associated with said current coding unit; and encoding said current coding unit; where said encoded current coding unit includes an indicator identifying whether said motion information associated with said current coding unit is to be replace said motion information associated with said collocated coding unit. Other embodiments of this aspect include corresponding computer systems, apparatus, and computer programs recorded on one or more computer storage devices, each configured to perform the actions of the methods.

BRIEF DESCRIPTION OF THE DRAWINGS

Further details of the present invention are explained with the help of the attached drawings in which:

FIGS. 8-10 depict embodiments of implementation within HEVC of the system and method described herein.

BRIEF DESCRIPTION OF THE DRAWINGS

Figure 1:
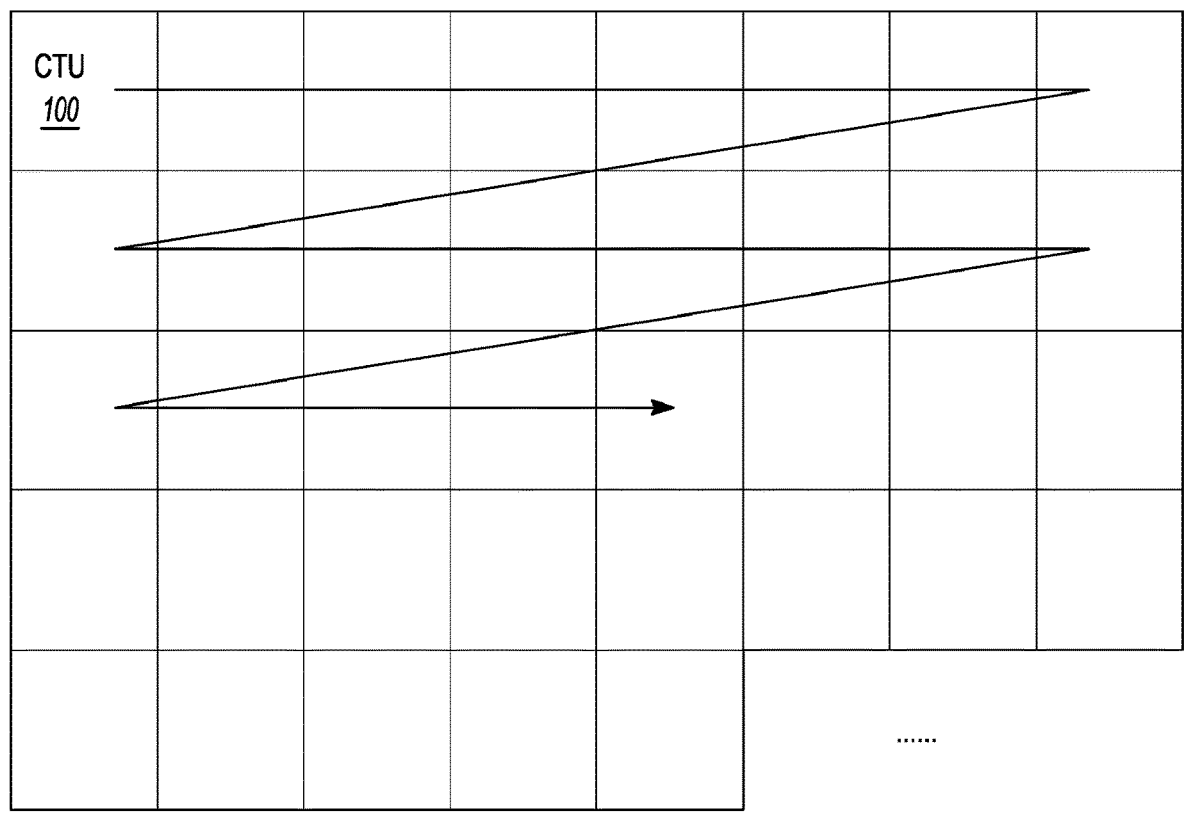
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2A:
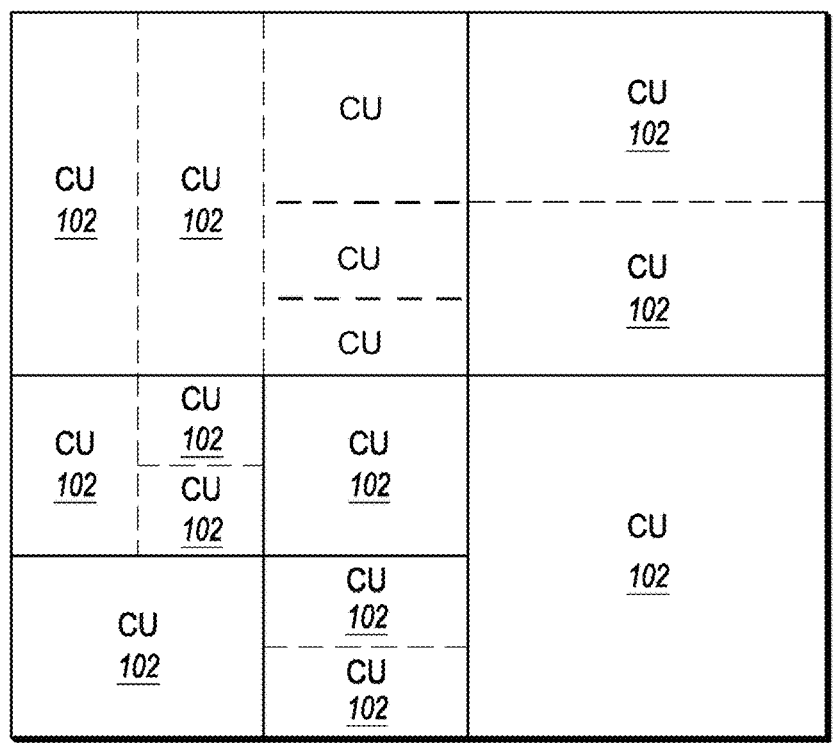
FIG. 2a-2c depict exemplary partitioning of a CTU into Coding Units (CUs).

FIG. 2a depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees. In VVC, a CTU 100 can be portioned into CUs utilizing ternary splitting also.

Figure 2B:
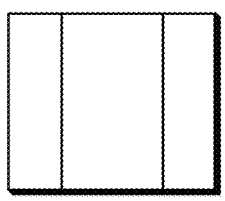
Figure 2C:
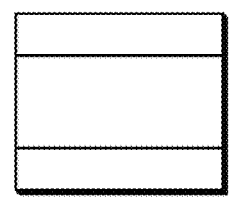

By way of a non-limiting example, FIG. 2a shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs. FIGS. 2b & 2c depict alternate, non-limiting examples of ternary splitting of a CU wherein subdivisions of the CUs are non-equal.

Figure 3:
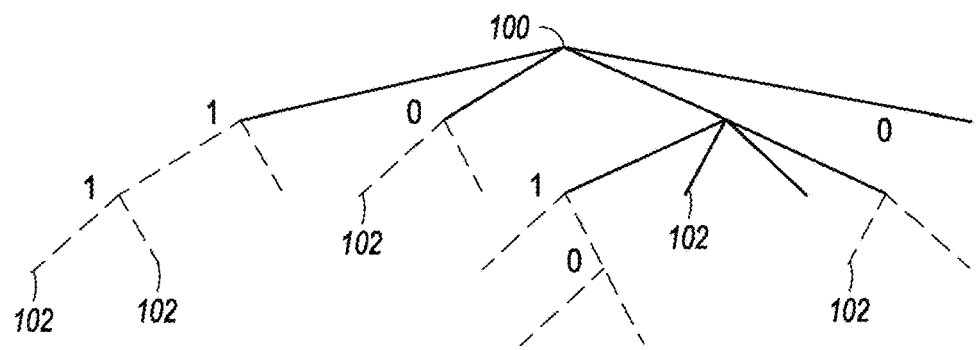
FIG. 3 depicts a quadtree plus binary tree (QTBT) representation of FIG. 2's CU partitioning.

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
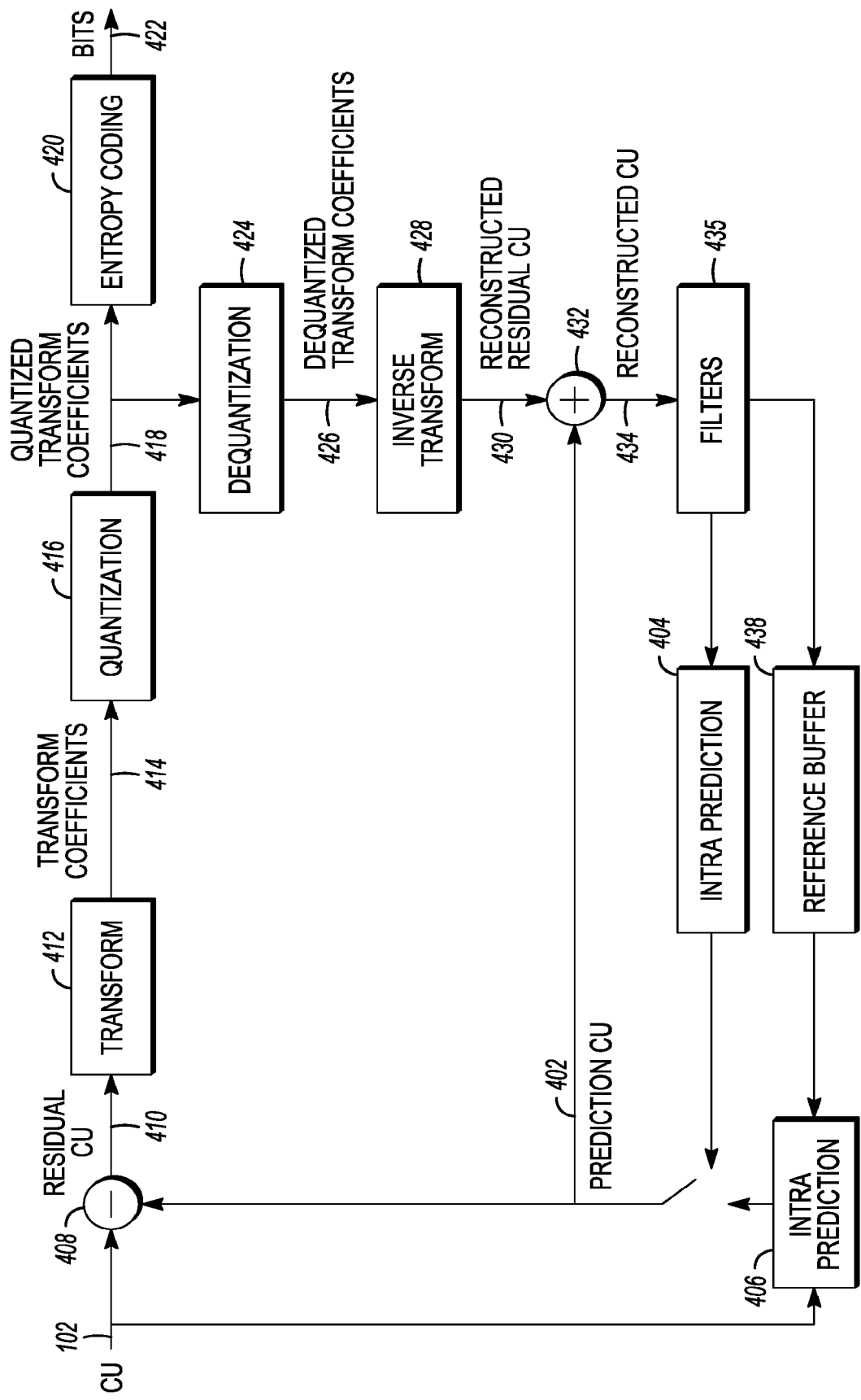
FIG. 4 depicts a simplified block diagram for CU coding in a JVET or VVC encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
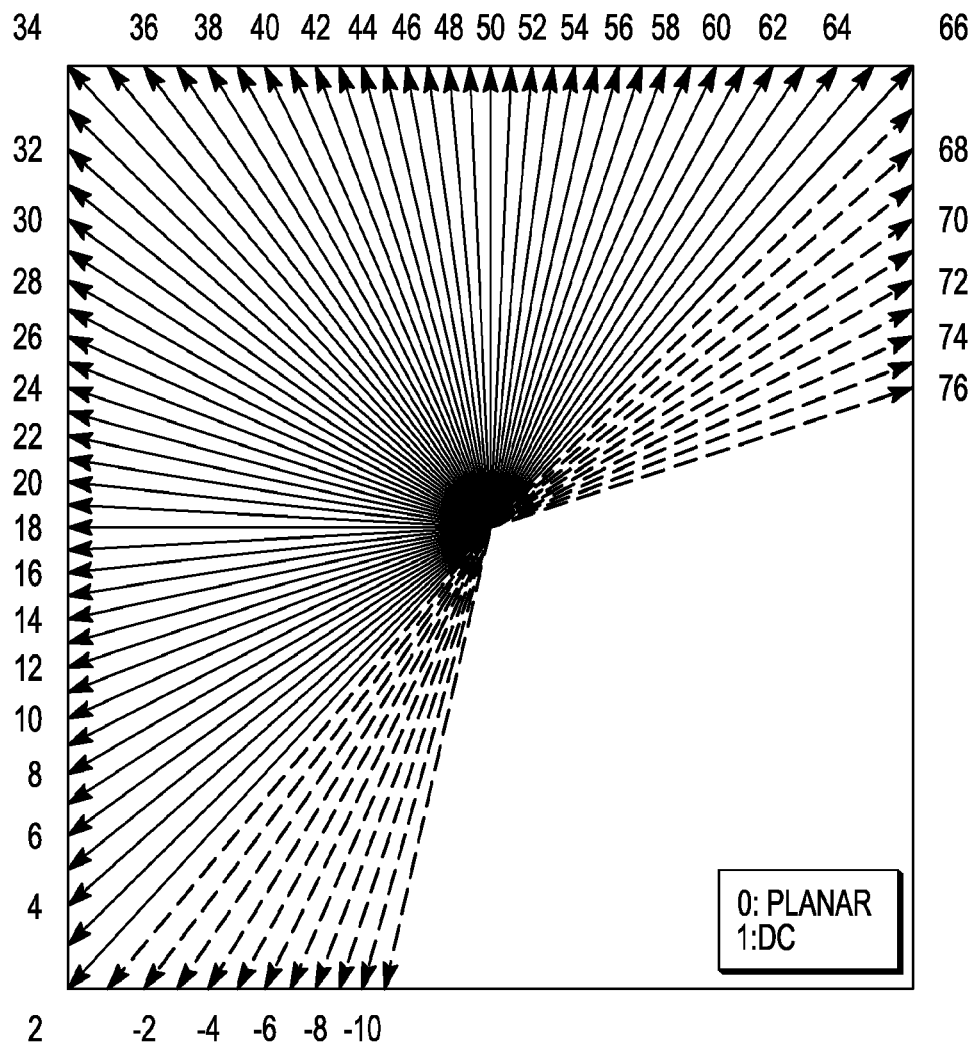
FIG. 5 depicts possible intra prediction modes for luma components in JVET of VVC.

When coding a CU' s luma component, the encoder can generate a list of candidate intra prediction modes. While HEVC had 35 possible intra prediction modes for luma components, in JVET there are 67 possible intra prediction modes for luma components and in VVC there are 85 prediction modes. These include a planar mode that uses a three dimensional plane of values generated from neighboring pixels, a DC mode that uses values averaged from neighboring pixels, the 65 directional modes shown in FIG. 5 that use values copied from neighboring pixels along the solid-line indicated directions and 18 wide-angle prediction modes that can be used with non-square blocks.

When generating a list of candidate intra prediction modes for a CU' s luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU' s luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at $\frac{1}{16}$ pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
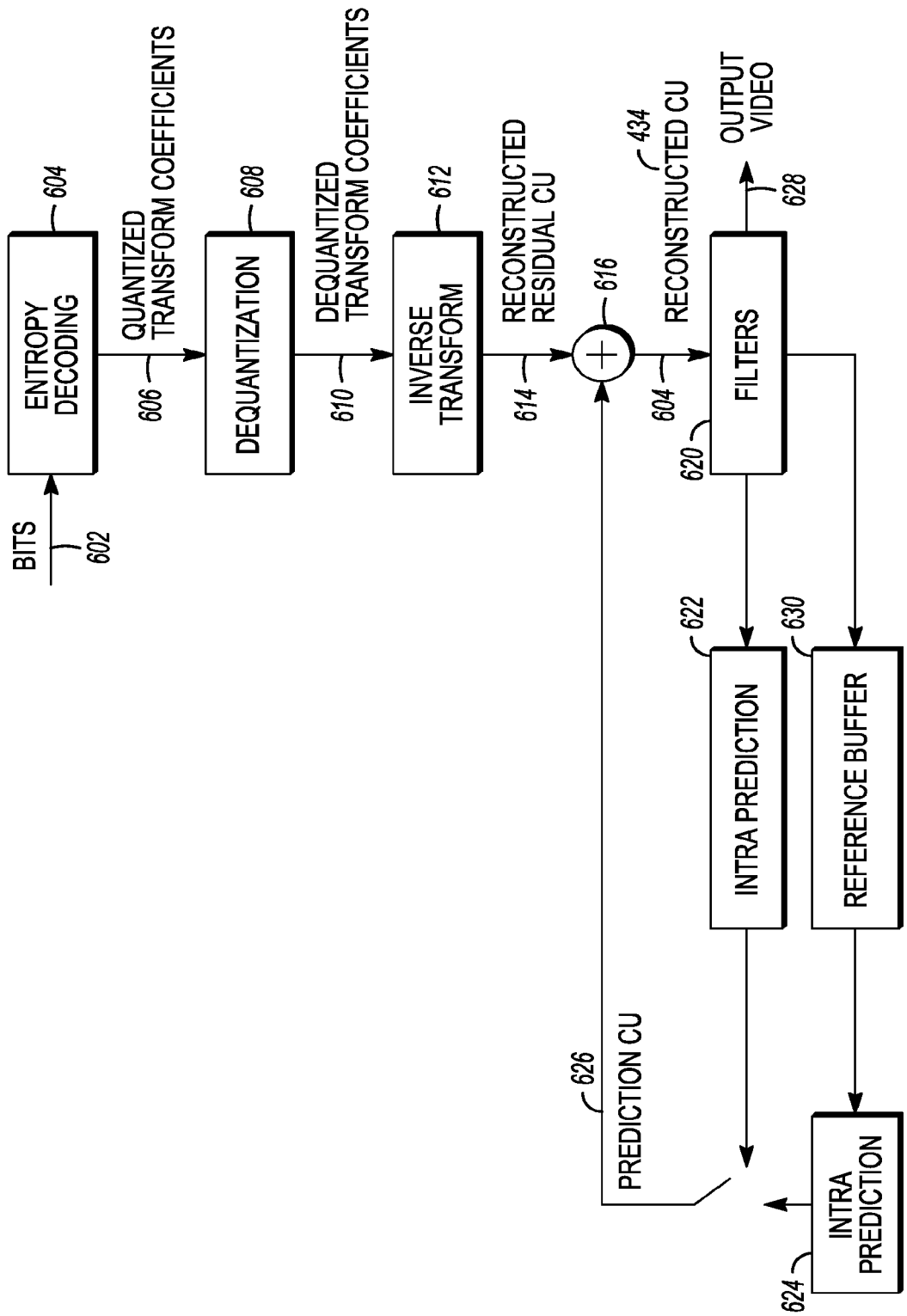
FIG. 6 depicts a simplified block diagram for CU coding in a JVET of VVC decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUs 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Motion information of a current picture is said to have strong correlation with motion information of the previously coded picture(s). Motion information of a block can include the block's coding mode, motion vectors and reference indices from reference lists. A current block in a current picture can use motion information of its collocated block in previously coded pictures to derive its own motion information. This concept has been used in the existing video compression standards, such as MPEG-4 AVC/H.264, HEVC, VP 9, VP 10 and other compression methods. In fact, MPEG-4 AVC/H.264, HEVC and VVC derives their direct mode for a current block in a current picture using the motion information of the current block's collocated block in one of the previously coded pictures. Additionally, HEVC and VVC derive both temporal motion vector prediction (TMVP) and merge mode for a current block in a current picture using motion information of the current block's collocated block in one of the previously coded pictures.

Temporal predication with multiple reference pictures is one of the powerful tools in many existing video compression standards, such as, by way of non-limiting example MPEG-4 AVC/H.264, HEVC and VVC. In operation, for a current (inter) picture, among the reference pictures, one of the reference pictures is defined as collocated picture and motion information of all the blocks of the collocated picture will be available for coding/decoding blocks of the current picture. The motion information, including mode, motion vectors and reference indices from the reference lists, of all blocks in the collocated pictures therefore need to be kept/stored at/in both encoder and decoder. In addition, since a current picture can use any reference picture in a reference picture buffer as its collocated picture, the motion information of all the reference pictures is stored. This storage is very costly in terms of encoder and decoder memories.

In operation in HEVC, one enabled flag at the SPS, sps_temporal_mvp_enabled_flag, is defined to enable/disable using of temporal motion information for a whole sequence. Once it is enabled at the SPS level, another enabled flag, slice_temporal_mvp_enabled_flag, is signaled at the slice level to further control whether temporal motion information is to be used or not for the current slice. If temporal motion information is enabled at the slice level, one syntax element, collocated_from_l0_flag, is then defined in the slice header. This flag is used to indicate which list is to be used to identify the collocated picture. If collocated_from_l0_flag is equal to 1, it specifies that the collocated picture is to be defined from list 0, otherwise, if collocated_from_l0_flag is equal to 0, the collocated picture is to be defined from list 1. If the number of reference pictures in the identified list is only one, the picture in the identified list will be considered as the collocated picture, otherwise, if the number of reference pictures in the identified list is more than one, another syntax element, collocated_ref_idx, is used to identify which picture in the identified list is to be identified as the collocated picture. By way of non-limiting example, if collocated_from_l0_flag is 1, there are five reference pictures are defined in list 0, and collocated_ref_idx is 2, the third picture in list 0 would be identified as the collocated picture.

Because any picture m the reference picture set (RPS) can be employed as a collocated picture and it is an encoder choice to select which picture in the RPS is set as the collocated picture, motion information for all reference pictures must be kept/stored at both encoder and decoder. In the HEVC system, motion information is kept based upon block sizes of 16×16 to have a better trade-off between coding performance and memory consumption requirement(s). Thus, in a situation in which five reference pictures are defined for coding a 1080p sequence in one HEVE encoder/decoder, 8160 blocks of size 16×16 ((1920/16)*(1080/16)) for one picture will be required. For B picture, there will be list 0 and list 1. 16 bits are required to store a motion vector and there are horizontal and vertical components for each motion vector. As a result, there are 5*8160*2*2*2=326,400 bytes needed to store all required motion vectors. For each block, the coding mode and reference index for both lists also need to be stored. Thus, in a system in which one byte is needed to store the mode and another two bytes are required for possible two reference indexes, another 5*8160*3=122,400 bytes are needed to store all information. Furthermore, additional memory is also needed to store the reference picture set (RPS) for all slices of all coded/decoded reference pictures. Thus, at least 448,800 bytes are needed to store temporal motion information in such a limited example.

In the JVET system, a smaller block size of 4×4 has been proposed to provide fine motion information. Therefore, the memory consumption requirement for JVET could be sixteen times more compared with that for HEVC.

Figure 7:
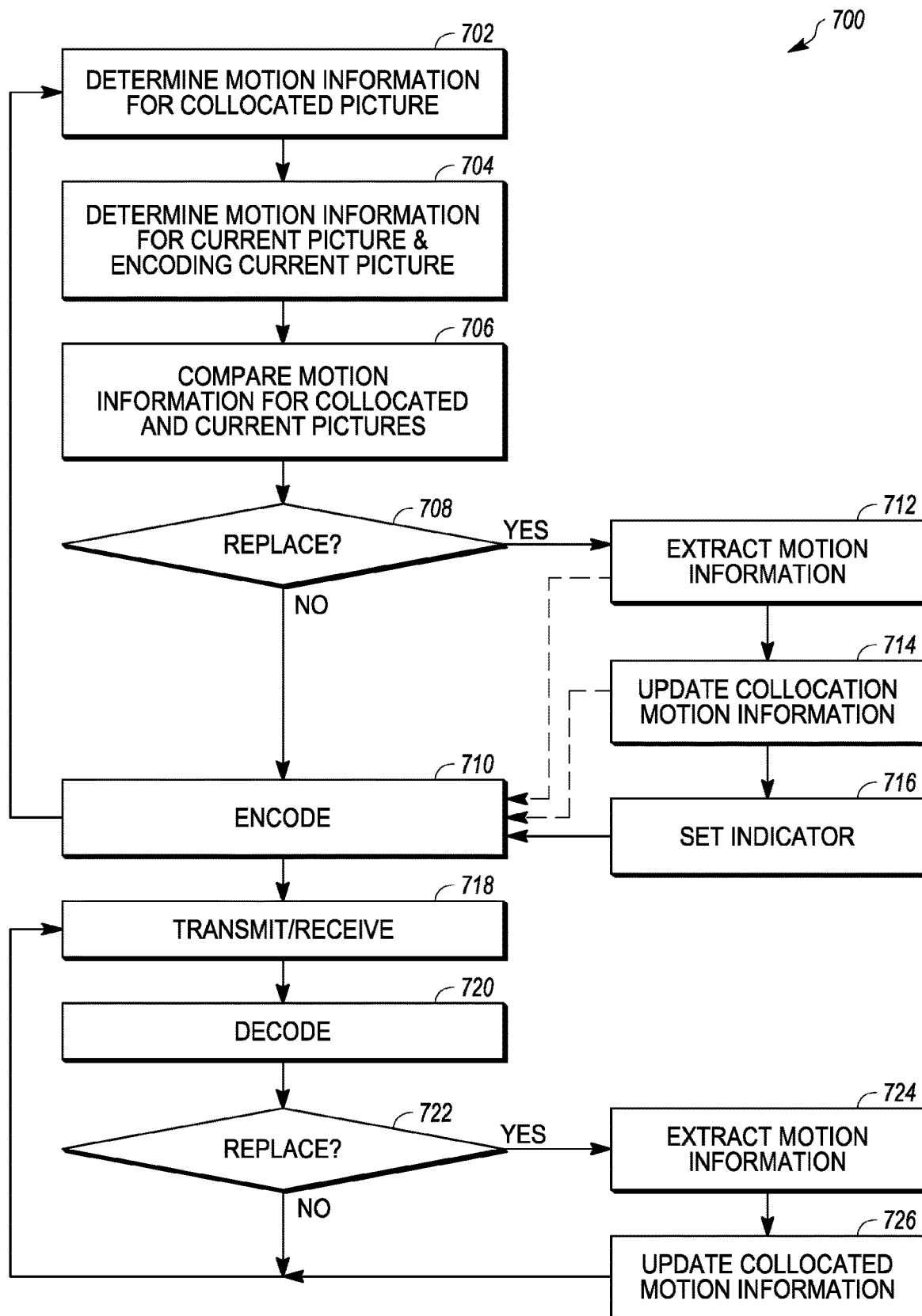
FIG. 7 depicts a block diagram of a system and method of motion information storage for video coding and signaling.

FIG. 7 depicts an efficient method of motion information storage for video coding and signaling. 700. In the embodiment depicted in FIG. 7, in step 702 motion information associated with a collocated picture is determined, then in step 704 motion information associated with a current picture and encoding current picture is determined. In step 706, the motion information for each of the collocated picture and the current picture are compared and in step 708 it is determined whether motion information associated with the current picture or the collocated picture should be updated and transmitted. In some embodiments, step 706 may be absent. If, in step 708, it is determined that motion information should not be updated, then in step 710, the system can proceed to encode the picture and include a flag indicator in the packet that indicates that the most recently stored motion information should be used for decoding the picture. However, if in step 708 it is determined that motion information should be updated, then in step 712 the motion information can be extracted for coding, in step 714 motion information stored at the encoder can be updated and then in step 716 an indicator can be established for inclusion in the encoded transmission that can signal to the decoder that the collocated motion information should be updated. Then in step 710, the updated collocation motion information, and indicator can be encoded with the picture in step 710. As depicted, in FIG. 7, in some embodiments, step 712 can provide information directly to the encoding step 710 and/or to step 714. Additionally, in some embodiments, step 712 and/or step 708 can directly trigger the step of setting the update indicator in step 716. That is, in some embodiments steps 714 and 716 may occur in parallel or in a sequence other than sequentially, as depicted in FIG. 7.

In step 718, a picture encoded in step 710 can be transmitted and received. In step 720 the recipient decoder can decode the received picture and determine whether the received transmission includes an indicator to update or replace its collocated motion information. If the transmission does not contain an indicator indicating that update/replacement of the collocated motion information is instructed, then the decoder can proceed to step 718 and await/receive the next picture. However, if is step 720 the decoder detects that an indicator has been received to update the collocated motion information, then a replacement/update decision can be triggered in step 722 and in step 724 the updated collocated motion information can be extracted and in step 726 the collocated motion information stored at the decoder can be updated in step 726, before the system proceeds back to step 718 to await/receive the next picture. However, in some alternate embodiments, the decoding 722 can proceed in parallel with the step 724 and 726 and/or decoding 722 can receive updated collocated motion information directly from step 724.

As described in relation to FIG. 7, in operation for a current picture, only the motion information of its collocated picture need be kept/stored at both encoder and decoder, and the motion information of other reference pictures in the reference buffer need not be kept/stored at the encoder and decoder. As described in reference to FIG. 7, in operation since there is only one collocated picture per current picture, the memory requirement for storing the motion information at both the encode and decoder can be reduced by N (=N/1) times, assuming there were N reference pictures in the reference buffer utilizing previous systems, as compared with the existing video coding standards.

Thus, in operation, the encoder can, using any known, convenient and/or desired system and/or method, determine if a current coded slice/picture will be used as collocated picture for the future pictures. If yes, the current coded picture will be signaled and its motion information, including its blocks' modes, motion vectors and reference indices from the reference lists, will be kept/stored for future coding/decoding, and the previously stored motion information of the past collocated picture will be replaced by the motion information of the new collocated picture. In some embodiments, more than one reference picture/slice can be stored. At the decode side, the signaled flag can be decoded to check if the current decoded slice/picture is to be used as collocated picture for future pictures. If yes, the motion information of the current decoded picture, including its blocks' modes, motion vectors and reference indices from the reference lists, are to be kept/stored for future coding/decoding, and the previously stored motion information of the past collocated picture can be replaced by the motion information of the new collocated picture. Thus, in some embodiments, a collocated picture may not necessarily be a reference picture for a current picture and it can be any previously coded/decoded picture.

FIGS. 8 and 9a-c depict a non-limiting example of how syntax and corresponding semantics could be defined within the HEVC specification to implement the motion information storing method described in reference to FIG. 7.

In the embodiment depicted in FIG. 8, reduced_collocated_mem_enabled_flag 802 can specify whether the proposed reduced collocated memory scheme is enabled or not. That is, in some embodiments, reduced_collocated_mem_enabled_flag equal to 1 can specify that the reduced collocated memory scheme will be used and reduced_collocated_mem_enabled_flag equal to O can specify that the current HEVC like scheme will be used. Moreover, in some embodiments, the reduced_collocated_mem_enabled_flag can be signaled at SPS/PPS or at both levels or at other levels. If it is signaled at more than two levels, e.g. both SPS and PPS levels, nested signaling method can be used to parse fewer bits.

Additionally, in FIGS. 9a-9c, update_collocated_pie_flag 902 can specify whether the current decoded picture is to be considered as collocated picture or not for future pictures. That is, in some embodiments, update_collocated_pie_flag 902 equal to 1 can specify that the current decoded picture is to be considered as the collocated picture for future pictures and if update_collocated_pie_flag 902 equal to 0 can specify that the current decoded picture will not be considered as collocated picture for future pictures. In some embodiments, update_collocated_pic_flag 902 can be signaled at the slice level or at other level(s). Additionally, update_collocated_pie_flag 902 can be signaled when enable_reduced_collocated_mem_flag 802 is equal to 1. Moreover, in some embodiments, if update_collocated_pic_flag 902 is not present, it can be inferred to be equal to 0. Such an adaptation of the HEVC syntax allows for removal of the memory burdensome code related to cabac_init_present_flag, collocated_from_l0 flag and collocated_ref_idx 904 and consequential reduction in memory requirements at the encoder and decoder for excess picture storage.

In current systems, the collocated picture was signaled at SPS and slice levels. However, earlier signaling can improve performance and efficiency. Accordingly, as depicted in FIG. 7, signaling of the collocated picture can be indicated at the Network Abstraction Layer (NAL) unit level to provide more flexibility. By way of non-limiting example, in some embodiments, the NAL type can be changed to indicate whether the current CVS (coded video sequence) is a collocated picture or not. In an alternate embodiment, a one-bit flag can be added in the NAL to indicate whether the current CVS (coded video sequence) is a collocated picture or not. A possible non-limiting syntax example for implementation in an HEVC system is shown in FIG. 10.

In FIG. 10, nuh_unit_col_type 1002 can specify whether the current NAL is a collocated picture or not. In some embodiments, nuh_unit_col_type 1002 being equal to 1 can specify that the current NAL is a collocated picture and nuh_unit_col_type 1002 being equal to 0 can specify that the current NAL is not a collocated picture. Additionally, in some embodiments, if the current NAL unit is not a VCL (NAL type larger than 32 in the HEVC), nuh_unit_col_type 1002 can be set as 0.

Figure 11:
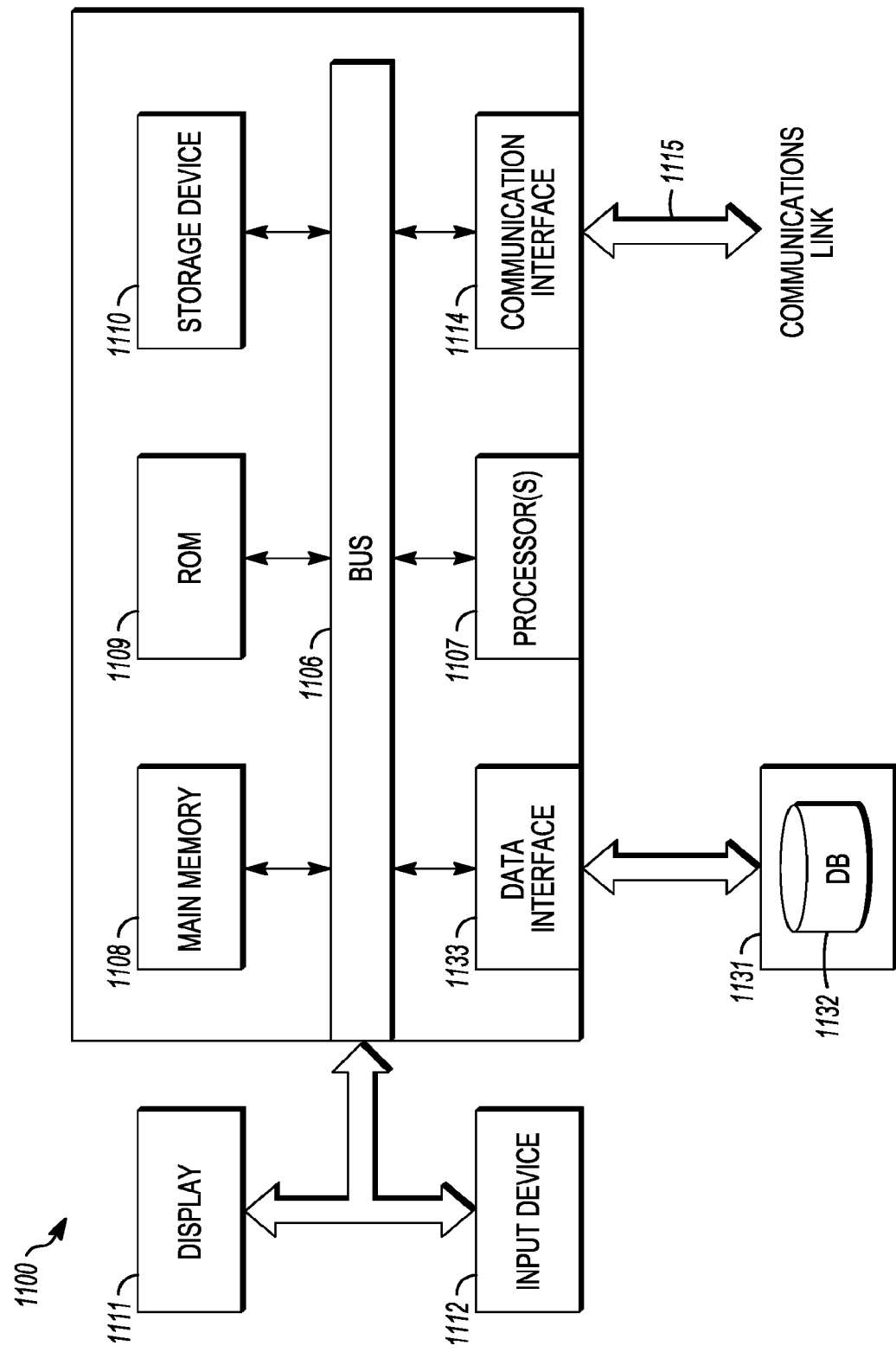
FIG. 11 depicts an embodiment of a computer system adapted and configured to provide for variable template size for template matching.

The execution of the sequences of instructions required to practice the embodiments can be performed by a computer system 1100 as shown in FIG. 11. In an embodiment, execution of the sequences of instructions is performed by a single computer system 1100. According to other embodiments, two or more computer systems 1100 coupled by a communication link 1115 can perform the sequence of instructions in coordination with one another. Although a description of only one computer system 1100 will be presented below, however, it should be understood that any number of computer systems 1100 can be employed to practice the embodiments.

A computer system 1100 according to an embodiment will now be described with reference to FIG. 11, which is a block diagram of the functional components of a computer system 1100. As used herein, the term computer system 1100 is broadly used to describe any computing device that can store and independently run one or more programs.

Each computer system 1100 can include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another computer system 1100. For example, the communication link 1115 can be a LAN, in which case the communication interface 1114 can be a LAN card, or the communication link 1115 can be a PSTN, in which case the communication interface 1114 can be an integrated services digital network (ISDN) card or a modem, or the communication link 1115 can be the Internet, in which case the communication interface 1114 can be a dial-up, cable or wireless modem.

A computer system 1100 can transmit and receive messages, data, and instructions, including program, i.e., application, code, through its respective communication link 1115 and communication interface 1114. Received program code can be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, that include data streams representing various types of signal information, e.g., instructions, messages and data. In embodiments, the functions of the data interface 1133 can be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be executed by the processor(s) 1107. The main memory 1108 also can be used for storing temporary data, i.e., variables, or other intermediate information during execution of instructions by the processor(s) 1107.

The computer system 1100 can further include a read only memory (ROM) 1109 or other static storage device coupled to the bus 1106 for storing static data and instructions for the processor(s) 1107. A storage device 1110, such as a magnetic disk or optical disk, can also be provided and coupled to the bus 1106 for storing data and instructions for the processor(s) 1107.

A computer system 1100 can be coupled via the bus 1106 to a display device 1111, such as, but not limited to, a cathode ray tube (CRT) or a liquid-crystal display (LCD) monitor, for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions can be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1107. Such a medium can take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that can not retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 12:
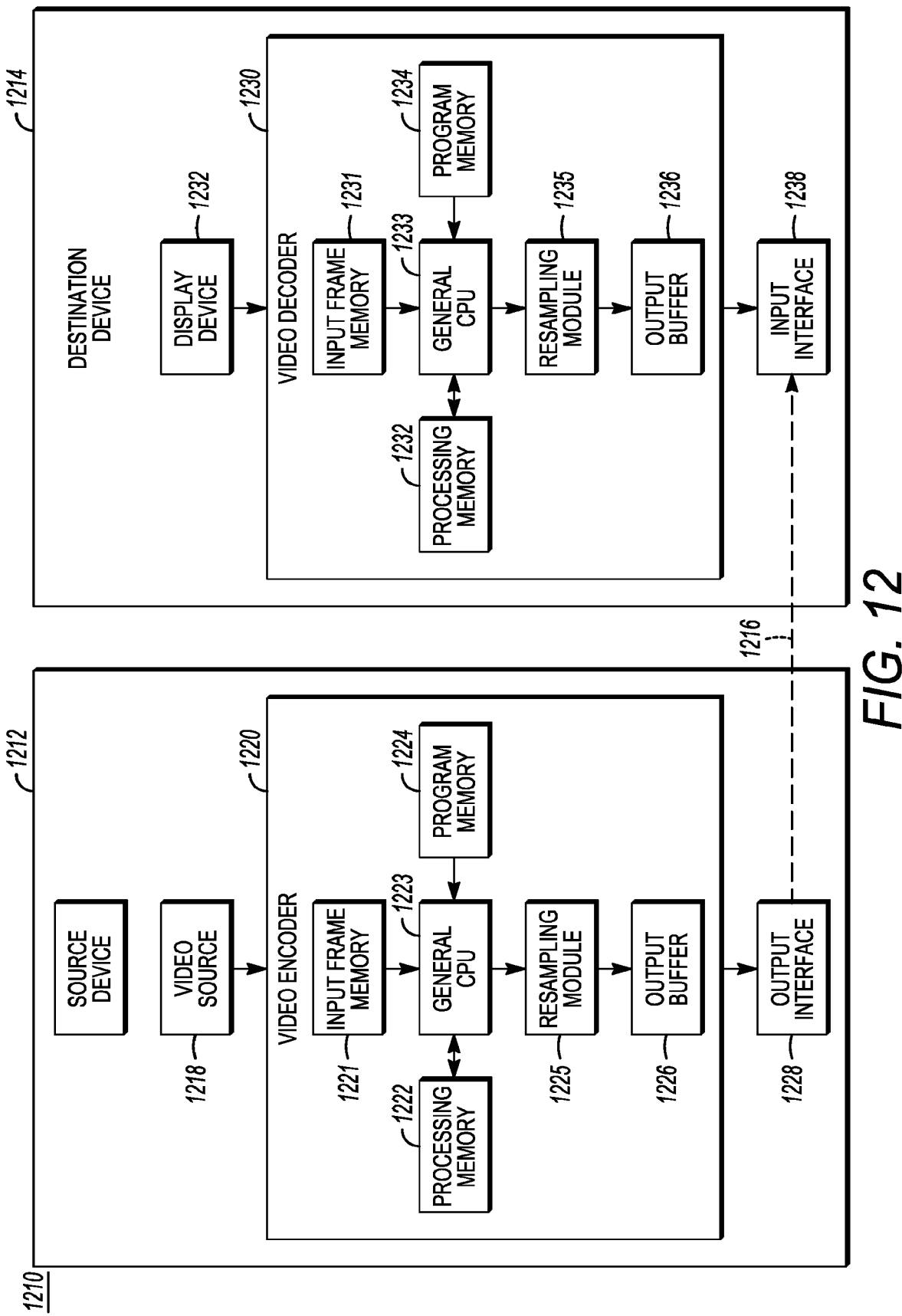
FIG. 12 depicts an embodiment of video encoder/decoder adapted and configured to provide for variable template size for template matching.

FIG. 12 is a high level view of a source device 1212 and destination device 1210 that may incorporate features of the systems and devices described herein. As shown in FIG. 12, example video coding system 1210 includes a source device 1212 and a destination device 1214 where, in this example, the source device 1212 generates encoded video data. Accordingly, source device 1212 may be referred to as a video encoding device. Destination device 1214 may decode the encoded video data generated by source device 1212. Accordingly, destination device 1214 may be referred to as a video decoding device. Source device 1212 and destination device 1214 may be examples of video coding devices.

Destination device 1214 may receive encoded video data from source device 1212 via a channel 1216. Channel 1216 may comprise a type of medium or device capable of moving the encoded video data from source device 1212 to destination device 1214. In one example, channel 1216 may comprise a communication medium that enables source device 1212 to transmit encoded video data directly to destination device 1214 in real-time.

In this example, source device 1212 may modulate the encoded video data according to a communication standard, such as a wireless communication protocol, and may transmit the modulated video data to destination device 1214. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1212 to destination device 1214. In another example, channel 1216 may correspond to a storage medium that stores the encoded video data generated by source device 1212.

In the example of FIG. 12, source device 1212 includes a video source 1218, video encoder 1220, and an output interface 1222. In some cases, output interface 1228 may include a modulator/demodulator (modem) and/or a transmitter. In source device 1212, video source 1218 may include a source such as a video capture device, e.g., a video camera, a video archive containing previously captured video data, a video feed interface to receive video data from a video content provider, and/or a computer graphics system for generating video data, or a combination of such sources.

Video encoder 1220 may encode the captured, pre-captured, or computer-generated video data. An input image may be received by the video encoder 1220 and stored in the input frame memory 1221. The general purpose processor 1223 may load information from here and perform encoding. The program for driving the general purpose processor may be loaded from a storage device, such as the example memory modules depicted in FIG. 12. The general purpose processor may use processing memory 1222 to perform the encoding, and the output of the encoding information by the general processor may be stored in a buffer, such as output buffer 1226.

The video encoder 1220 may include a resampling module 1225 which may be configured to code (e.g., encode) video data in a scalable video coding scheme that defines at least one base layer and at least one enhancement layer. Resampling module 1225 may resample at least some video data as part of an encoding process, wherein resampling may be performed in an adaptive manner using resampling filters.

The encoded video data, e.g., a coded bit stream, may be transmitted directly to destination device 1214 via output interface 1228 of source device 1212. In the example of FIG. 12, destination device 1214 includes an input interface 1238, a video decoder 1230, and a display device 1232. In some cases, input interface 1228 may include a receiver and/or a modem. Input interface 1238 of destination device 1214 receives encoded video data over channel 1216. The encoded video data may include a variety of syntax elements generated by video encoder 1220 that represent the video data. Such syntax elements may be included with the encoded video data transmitted on a communication medium, stored on a storage medium, or stored a file server.

The encoded video data may also be stored onto a storage medium or a file server for later access by destination device 1214 for decoding and/or playback. For example, the coded bitstream may be temporarily stored in the input buffer 1231, then loaded in to the general purpose processor 1233. The program for driving the general purpose processor may be loaded from a storage device or memory. The general purpose processor may use a process memory 1232 to perform the decoding. The video decoder 1230 may also include a resampling module 1235 similar to the resampling module 1225 employed in the video encoder 1220.

FIG. 12 depicts the resampling module 1235 separately from the general purpose processor 1233, but it would be appreciated by one of skill in the art that the resampling function may be performed by a program executed by the general purpose processor, and the processing in the video encoder may be accomplished using one or more processors. The decoded image(s) may be stored in the output frame buffer 1236 and then sent out to the input interface 1238.

Display device 1238 may be integrated with or may be external to destination device 1214. In some examples, destination device 1214 may include an integrated display device and may also be configured to interface with an external display device. In other examples, destination device 1214 may be a display device. In general, display device 1238 displays the decoded video data to a user.

Video encoder 1220 and video decoder 1230 may operate according to a video compression standard. ITU-T VCEG (Q6/16) and ISO/IEC MPEG (JTC I/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1220 and video decoder 1230 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1220 and video decoder 1230 may be implemented in hardware, software, firmware or any combination thereof. For example, the video encoder 1220 and decoder 1230 may employ one or more processors, digital signal processors (DSPs), application specific integrated circuits (ASICs), field programmable gate arrays (FPGAs), discrete logic, or any combinations thereof. When the video encoder 1220 and decoder 1230 are implemented partially in software, a device may store instructions for the software in a suitable, non-transitory computer-readable storage medium and may execute the instructions in hardware using one or more processors to perform the techniques of this disclosure. Each of video encoder 1220 and video decoder 1230 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 1223 and 1233 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1223 and 1233.

A storage device may also store instructions, instructions, such as source code or binary code, for performing the techniques described above. A storage device may additionally store data used and manipulated by the computer processor. For example, a storage device in a video encoder 1220 or a video decoder 1230 may be a database that is accessed by computer system 1223 or 1233. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. A method decoding a video with a decoder that includes a processor comprising:
   (a) receiving a bitstream having a plurality of pictures, each of the plurality of pictures indicating how a plurality of coding tree units for a respective single picture was partitioned into a plurality of coding units of the respective single picture that includes a partitioning structure that indicates a first node that is partitioned with a first binary partitioning defining a pair of first child nodes one of which is partitioned with a second binary partitioning, and that includes said partitioning structure that indicates a second node that is partitioned with a first ternary partitioning defining a triplet of second child nodes one of which is partitioned with a second ternary partitioning, where said pair of first child nodes of said first binary partitioning the other of which is partitioned with a ternary partitioning defining a triplet of child nodes, where said triplet of second child nodes of said first ternary partitioning another of which is partitioned with a binary partitioning defining a pair of child nodes, and that includes said partitioning structure that indicates a third node that is partitioned with a second ternary partitioning defining a triplet of third child nodes, where at least one of said coding units is rectangular;
   (b) receiving a plurality of collocated coding units for the respective single picture;
   (c) receiving motion information associated each of said plurality of collocated coding units for the respective single picture;
   (d) receiving a current coding unit;
   (e) receiving motion information associated with said current coding unit;
decoding said current coding unit;
   (g) receiving a plurality of indicators one of which identifying whether said motion information associated with one of the plurality of said collocated coding units of the respective single picture is to be modified by said motion information associated with said current coding unit, where each of said plurality of said indicators being a single bit is included in a respective NAL unit header which is a part of a respective NAL unit of a respective one of said plurality of collocated coding units, where none of said plurality of indicators are included in a sequence parameter set.

2. The method of claim 1 wherein said indicator indicates that said motion information associated with said one of said collocated coding units is not to be modified by said motion information associated with said current coding unit.

3. The method of claim 1 wherein said indicator indicates whether said motion information associated with said one of said collocated coding units is not to be used for a future coding unit.

4. The method of claim 1 where said current coding unit is encoded according to VVC.

5. A method decoding a video with a decoder that includes a processor comprising:
   (a) receiving a bitstream having a plurality of pictures, each of the plurality of pictures indicating how a plurality of coding tree units for a respective single picture was partitioned into a plurality of coding units of the respective single picture that includes a partitioning structure that indicates a first node that is partitioned with a first binary partitioning defining a pair of first child nodes one of which is partitioned with a second binary partitioning, and that includes said partitioning structure that indicates a second node that is partitioned with a first ternary partitioning defining a triplet of second child nodes one of which is partitioned with a second ternary partitioning, where said pair of first child nodes of said first binary partitioning the other of which is partitioned with a ternary partitioning defining a triplet of child nodes, where said triplet of second child nodes of said first ternary partitioning another of which is partitioned with a binary partitioning defining a pair of child nodes, and that includes said partitioning structure that indicates a third node that is partitioned with a second ternary partitioning defining a triplet of third child nodes, where at least one of said coding units is rectangular;
   (b) receiving a plurality of rectangular collocated coding units for the respective single picture;
   (c) receiving motion information associated with each of said plurality of rectangular collocated coding units for the respective single picture;
   (d) receiving a rectangular current coding unit;
   (e) determining motion information associated with said current coding unit based upon previously received motion information for a previously received coding unit other than said rectangular current coding unit;
   (f) decoding said current coding based upon said previously received motion information maintained in said decoder prior to receiving said rectangular current coding unit;
   (g) removing from said decoder said previously received motion information.

6. A method for storing bitstream of encoded video data for decoding by a decoder, with storing the encoded video data by a computer-readable storage medium, wherein:
   (a) said bitstream containing data indicating a plurality of pictures, each of the plurality of pictures indicating how a plurality of coding tree units for a respective single picture was partitioned into a plurality of coding units of the respective single picture that includes a partitioning structure that indicates a first node that is partitioned with a first binary partitioning defining a pair of first child nodes one of which is partitioned with a second binary partitioning, and that includes said partitioning structure that indicates a second node that is partitioned with a first ternary partitioning defining a triplet of second child nodes one of which is partitioned with a second ternary partitioning, where said pair of first child nodes of said first binary partitioning the other of which is partitioned with a ternary partitioning defining a triplet of child nodes, where said triplet of second child nodes of said first ternary partitioning another of which is partitioned with a binary partitioning defining a pair of child nodes, and that includes said partitioning structure that indicates a third node that is partitioned with a second ternary partitioning defining a triplet of third child nodes, where at least one of said coding units is rectangular;
(b) said bitstream containing data indicating a plurality of rectangular collocated coding units for the respective single picture;
(c) said bitstream containing data indicating motion information associated with each of said plurality of rectangular collocated coding units for the respective single picture;
(d) said bitstream containing data indicating a rectangular current coding unit;
(e) said bitstream containing data indicating motion information associated with said current coding unit based upon previously received motion information for a previously received coding unit other than said rectangular current coding unit;
(f) said bitstream containing data indicating how decoding said current coding based upon said previously received motion information maintained in said decoder prior to receiving said rectangular current coding unit;
(g) wherein said bitstream is configured such that upon decoding said encoded video within said bitstream a decoder removes from said decoder said previously received motion information.

7. A method encoding a video with an encoder that includes a processor comprising:
(a) wherein said encoding is based upon a bitstream having a plurality of pictures, each of the plurality of pictures indicating how a plurality of coding tree units for a respective single picture was partitioned into a plurality of coding units of the respective single picture that includes a partitioning structure that indicates a first node that is partitioned with a first binary partitioning defining a pair of first child nodes one of which is partitioned with a second binary partitioning, and that includes said partitioning structure that indicates a second node that is partitioned with a first ternary partitioning defining a triplet of second child nodes one of which is partitioned with a second ternary partitioning, where said pair of first child nodes of said first binary partitioning the other of which is partitioned with a ternary partitioning defining a triplet of child nodes, where said triplet of second child nodes of said first ternary partitioning another of which is partitioned with a binary partitioning defining a pair of child nodes, and that includes said partitioning structure that indicates a third node that is partitioned with a second ternary partitioning defining a triplet of third child nodes, where at least one of said coding units is rectangular;
(b) wherein said encoding is based upon a plurality of rectangular collocated coding units for the respective single picture;
(c) wherein said encoding is based upon motion information associated with each of said plurality of rectangular collocated coding units for the respective single picture;
(d) wherein said encoding is based upon a rectangular current coding unit;
(e) wherein said encoding is based upon motion information associated with said current coding unit based upon previously received motion information for a previously received coding unit other than said rectangular current coding unit;
(f) wherein said encoding is based upon decoding said current coding based upon said previously received motion information maintained in said decoder prior to receiving said rectangular current coding unit;
(g) wherein said encoding is based upon removing from said decoder said previously received motion information.

* * * * *